United States Patent
Tamjid et al.

(10) Patent No.: US 11,516,517 B2
(45) Date of Patent: Nov. 29, 2022

(54) LOCALIZED DYNAMIC VIDEO STREAMING SYSTEM

(71) Applicants: Sm Tamjid, Northborough, MA (US); Reazul Hasan Russel, Dover, NH (US)

(72) Inventors: Sm Tamjid, Northborough, MA (US); Reazul Hasan Russel, Dover, NH (US)

( * ) Notice: Subject to any disclaimer, the term of this patent is extended or adjusted under 35 U.S.C. 154(b) by 0 days.

(21) Appl. No.: 17/206,879

(22) Filed: Mar. 19, 2021

(65) Prior Publication Data

US 2022/0303592 A1    Sep. 22, 2022

(51) Int. Cl.
| | |
|---|---|
| *H04N 21/218* | (2011.01) |
| *H04N 21/258* | (2011.01) |
| *G01S 19/01* | (2010.01) |
| *H04N 21/2187* | (2011.01) |
| *H04N 21/414* | (2011.01) |
| *G06K 9/62* | (2022.01) |
| *G06V 20/10* | (2022.01) |

(52) U.S. Cl.
CPC ....... *H04N 21/21805* (2013.01); *G01S 19/01* (2013.01); *G06K 9/6215* (2013.01); *G06V 20/10* (2022.01); *H04N 21/2187* (2013.01); *H04N 21/25841* (2013.01); *H04N 21/41407* (2013.01)

(58) Field of Classification Search
CPC ......... H04N 21/21805; H04N 21/2187; H04N 21/25841; H04N 21/41407; G01S 19/01; G06K 9/00664; G06K 9/6215; G06V 20/10
See application file for complete search history.

(56) References Cited

U.S. PATENT DOCUMENTS

| | | | |
|---|---|---|---|
| 7,239,760 B2 | 7/2007 | Di Bernardo | |
| 7,428,000 B2 | 9/2008 | Cutler | |
| 8,164,617 B2 | 4/2012 | Mauchly | |
| 8,385,971 B2 | 2/2013 | Rhoads | |
| 8,854,457 B2 | 10/2014 | De Vleeschouwer | |
| 9,055,189 B2 | 6/2015 | Su | |
| 9,544,489 B2 | 1/2017 | Laforte | |
| 9,699,418 B2 | 7/2017 | Catrein | |
| 10,015,527 B1 | 7/2018 | Banta | |
| 10,219,008 B2 | 2/2019 | Crowe | |
| 10,313,656 B2 | 6/2019 | Sadi | |
| 2011/0249086 A1 | 10/2011 | Guo | |
| 2013/0050394 A1 | 2/2013 | Zhou | |
| 2014/0146132 A1 | 5/2014 | Bagnato | |
| 2017/0104927 A1 | 4/2017 | Mugavero | |
| 2018/0035136 A1* | 2/2018 | Crowe ............... | H04N 21/4307 |

FOREIGN PATENT DOCUMENTS

| | | |
|---|---|---|
| WO | 2013137840 | 9/2013 |
| WO | 2016191467 | 12/2016 |

* cited by examiner

*Primary Examiner* — Alazar Tilahun
(74) *Attorney, Agent, or Firm* — Lambert Shortell & Connaughton; David J. Connaughton, Jr.; Justin P. Tinger

(57) ABSTRACT

A computerized system operable to provide multiple video streams of an event. In an ideal embodiment, the system provides live and dynamic streaming of an event such as a sporting event, concert, march, rally, and the like, to allow viewers to watch video of the event from nearly any angle and vantage point.

22 Claims, 5 Drawing Sheets

LOCALIZED DYNAMIC VIDEO STREAMING SYSTEM

BACKGROUND

Technical Field

The present disclosure relates generally to video sharing and streaming systems. More particularly the present disclosure relates to a system which allows for viewing of an event from multiple viewpoints and/or dynamic viewing using videos of the event recorded at different locations. The system tracks relative position of the different cameras, allowing a user interface to select the desired camera location.

Description of Related Art

When viewing an event, either live or remotely, as well as when attending a live event, it is often desirable to see the event and/or a replay video from a different angle. This allows for the viewer to get more and better information and improves the experience. For example, if a ball went out of bounds or not may be impossible to see from one angle, but easy to see from another. Or, if action is happening on one side of the field or court away from the viewer or the particular camera recording the event, it may be desirable to switch views as controlled by a user. Further still, if a user is remotely watching a video of an event or broadcast, a user may wish to be able to control the angle and position of the camera view.

In modern times, with the proliferation of mobile computing devices such as smart phones, nearly all live events are recorded with multiple cameras from multiple different angles. Given enough of these videos, it is plausible that a full multi-angled viewing of events could be possible.

Therefore, what is needed is a system that may leverage the use of active video recordings from many angles to allow for multi-angle and dynamic visibility of a certain event.

SUMMARY

The subject matter of this application may involve, in some cases, interrelated products, alternative solutions to a particular problem, and/or a plurality of different uses of a single system or article.

In one aspect, a localized multi-view video streaming system is provided. The system includes a mobile computing device having a camera, a memory, a GPS receiver and a microprocessor. The system also includes a server which is in wireless communication with the mobile computing device. The server is operable to transmit at least one video stream to the mobile computing device, typically through an internet connection or other networked connection. In most embodiments, the server identifies the location of the mobile computing device based on a location information provided to the server from the mobile computing device and provides the at least one video stream at least partially based on this location information. The system is operable to map relative positions of the at least one video stream or streams compared to the mobile computing device. This allows the mobile computing device to easily identify a recording location of the camera recording the at least one video stream relative to itself. Depending on embodiment, either the server, the mobile computing device, or both are operable to calculate a location of the at least one video stream relative to the mobile computing device.

In another aspect, a method of viewing a plurality of video streams relatively mapped to a location of a mobile computing device. The method involves receiving, by a mobile computing device, a plurality of video streams via a networked connection to a server. The mobile computing device comprises a camera, a memory, a GPS receiver, and a microprocessor. The method further involves receiving, from the server, a quantity of data comprising a relative location of each of the plurality of video streams relative to a location of the mobile computing device. Based on this received information, the mobile computing device may present on a display screen, an indication of the relative position of the plurality of video streams allowing a user to select a desired video stream based on its recording location. The method further involves presenting an indication of the relative position of each of the plurality of video streams on the display of the mobile computing device. The device may receive an input by a user to indicate one of the plurality of video streams, and the device is operable to present the selected one of the plurality of video streams on the display.

DETAILED DESCRIPTION

Figure 1:
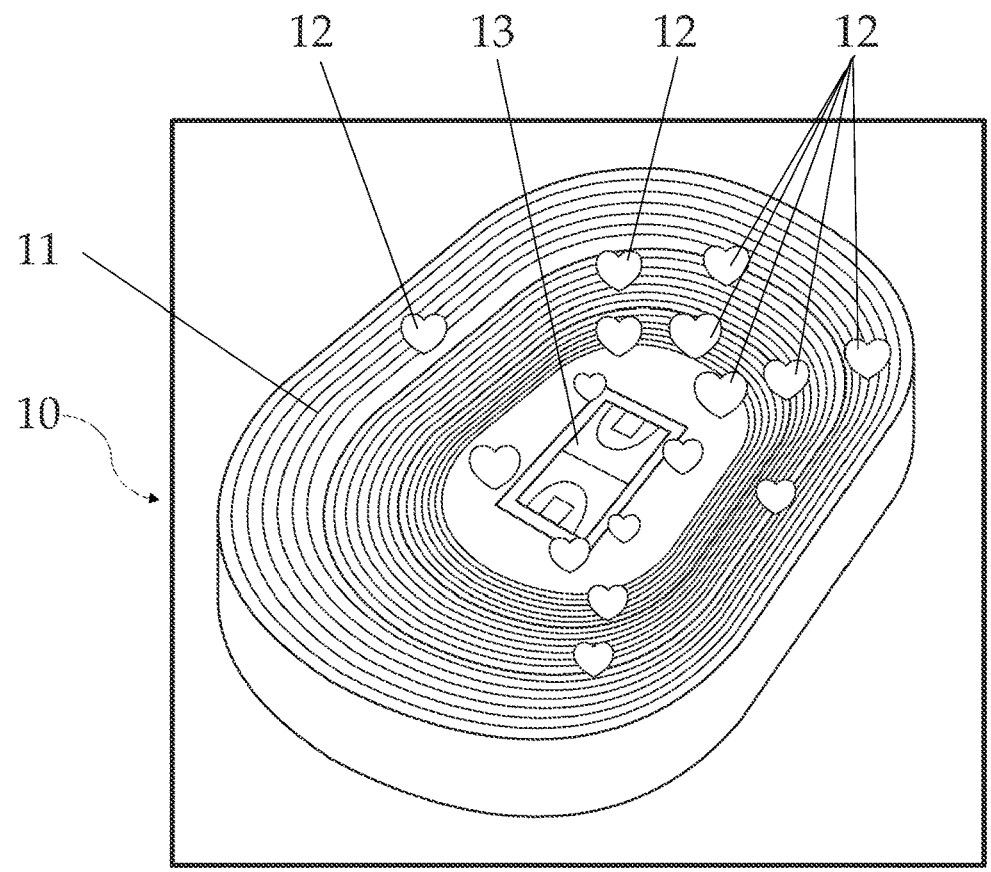
FIG. 1 provides a perspective view of a stadium having a number of active cameras recording an event.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns systems and methods of dynamically and relatively mapping video streams, or "nodes" to allow a user to both record video from their position, and/or view video from another position relative to their own. The systems and methods herein may group closely positioned cameras/nodes into clusters, and then dynamically maps other nodes or clusters relative to each other keeping relative positions updated in real time. This allows for a user to view camera streams from other positions and provides a user interface allowing the user to select a stream at a desired location. The system may be used for both live video streaming, as well as replay via pre-recorded video streaming. In another embodiment, the system may also create clusters having only one node such that any node operating within the system is assigned to a cluster. Such an embodiment may simplify processing and algorithm treatment, increasing efficiency. In most embodiments, the system will be localized in that the different video streams are available to a mobile computing device within a certain proximity of the event in question. However, in other embodiments, remote devices not near the even may also access the video system.

This user interface may allow for relative movement (i.e. view a camera to the right, to the left, opposite, up/down, etc.) and/or may superimpose the camera node locations onto a map or other diagram of the event location, allowing a user to select the particular location on this map and node interface. The number of cameras in each cluster, and their relative position to each other stays updated in realtime, allowing each node to browse views from other relatively mapped cameras. As a whole, the system and methods herein allow viewing of an event from multiple viewpoints, and ideally, with enough cameras, allows for seamless dynamic visibility of an event in a specific area. This results in a localized, multi-view or dynamic video streaming system.

In many embodiments, most if not all of the video recording device nodes and viewing nodes (which may also be recording video, or not) may be mobile computing devices belonging to individuals. The term mobile computing device is used herein to refer to the various portable computerized tools carried by individuals. Such mobile computing devices include, but are not limited to smartphones, tablet computers, smart watches, video camera-equipped accessories such as glasses, hats, and other devices which are generally battery powered devices having a microprocessor and memory, as well as networking capability, and optionally having a video camera and/or a display screen.

In one embodiment, dynamic mapping may be performed by a remote server, while in other embodiments, the mapping may be performed by a user's personal mobile computing device such as their mobile phone. In some cases, both server and mobile computing device can be used in the determination of relative location of a video stream node to the user device. Location information may be aggregated at a remote server, allowing users to access streams based on the requested location.

In operation, the clustering of close nodes allows a user to select the cluster for a general location, and then to view different streams from the different nodes of the cluster, allowing the user to explore details of any specific cluster. The user interface of the system will allow the user to scroll or otherwise navigate through each cluster, and once the cluster is selected, scroll or otherwise navigate through the different options within a node. This clustering operation also allows for the system to lazily load, stream, and calculate relative locations using only a subset of the videos/ streams. As such, this clustering contributes to optimizing the memory, data flow, and computation required by a server or servers, networks, and end user devices. As is well known, battery life is an important issue especially when at a public event away from a charging station. Therefore, optimizing computations, networked data flow, and thus data usage, is important to prolong battery life and reduce energy consumption. This makes the system contemplated herein more practical for frequent and extended use.

In one embodiment, the system may be operable to use GPS or other location data gathered from the mobile computing devices to efficiently group closely located nodes into clusters of other nearby nodes. Once clustered, additional computerized methods may be employed to further pinpoint relative location of the different nodes to each other and/or to a user's mobile computing device. This may provide for more simple and less resource-intensive cluster positioning, saving more resource-intensive calculations to pinpoint location for the limited nodes of each cluster. In other embodiments, computerized methods for determining location other than, or in addition to, GPS may be used to group nodes into clusters, as well as determining relative locations of the specific nodes.

While GPS location data is very convenient and handy in many cases, such as when driving or walking on city streets to find directions, resolution of GPS data is limited. GPS has an error of at least a foot or more in any direction, usually at least a few feet. This is not a problem for driving directions. However, for the purposes of locating the source of a video stream in a small space such as a sports arena, this uncertainty will be insufficient for proper positioning and relative mapping by the system, and not fully suitable for many embodiments of the system disclosed herein. Therefore, additional or alternative methods may be employed to properly identify the location of a video stream to properly implement the present system.

In one embodiment, mapping of nodes may be performed using sensor data. Each node (mobile computing device) contains information about its location and the system is able to access that information pinpoint each node. For example, using GPS data in one embodiment, pairwise distance between the nodes may be calculated with the latitude/longitude points on the basis of spherical earth. For example, the haversine formula may be used to calculate the great-circle distance between two points as:

$$a = \sin^2(\Delta\phi/2) + \cos\phi_1 \cos\phi_2 \sin^2(\Delta\lambda/2)$$

Where $\phi$ is the latitude and $\lambda$ is the longitude in radians, $\Delta\phi$ and $\Delta\lambda$ are the differences between latitude and longitude values. The distance d is then computed as:

$$d = R \cdot 2 \cdot \operatorname{atan} 2(\sqrt{a}, \sqrt{1-a})$$

Where R is the radius of earth with a mean value of 6,371 km. This haversine formula remains numerically stable for nodes even for small distances.

The relative bearing between two nodes is the angle between the north-south line of Earth and the line connecting the two nodes. We compute this angle as:

$$\theta = \operatorname{atan} 2(\sin\Delta\lambda \cdot \cos\phi_2, \cos\phi_1 \sin\phi_2 - \sin\phi_1 \cos\phi_2 \cos\Delta\lambda)$$

With the estimates of distance and angle between two points, the system is able to calculate a reasonably precise estimate of the relative positions of two nodes.

In further embodiments, the system can determine the camera direction from a measure of absolute bearing (angle between magnetic/true north and the node itself). This provides which direction the node is facing, independent of other nodes.

In a further embodiment, accelerometer information may be used to keep track of the location of a node once determined. For example, once the location of the device is accurately known, accelerometer data may be able to tell that a user carrying the device has walked ten steps. Current positon may then be determined based on this information.

In still a further embodiment, a gyroscope data may be able to provide information about the orientation of the device. This may be particularly useful once an initial orientation of the device is known. The gyroscope may indicate an amount moved from the known position, allowing calculation of the new current position.

In another embodiment, mapping of the relative positions of nodes may be performed using computer vision techniques to compute the relative positions based on overlapped regions of image/video streams. Examples of these techniques may include, but are not limited to template matching and feature matching, among others.

For example, using template matching, it is possible to discretize two images from two different nodes with a reasonable resolution and perform a template matching over the discretized tiles. To do that, one option is to calculate the cross-correlation between two streams of images from two different nodes. This essentially is a simple sum of pairwise multiplications of corresponding pixel values of the images.

$$\text{cross correlation}(stream_1, stream_2) = \sum_{i,j} stream_1(i, j) \times stream_2(i, j)$$

Occurrence of a matched tile will indicate that overlapping regions exist between the two images or image streams from the different nodes, and number of matched tiles will quantify the amount of overlap. The location of the matched tiles will give a sense of relative position of the camera capturing the image.

In another example, using feature matching, it is possible to use scale invariant feature transform (SIFT) to detect and describe features available in an image. SIFT is rotation and scale invariant and proceeds in four main steps: i) finding potential locations for features, ii) locating feature keypoints with reasonable accuracy, iii) assigning orientation to keypoints, iv) represent the kepoints as a high dimensional vector, and finally v) run the keypoint matching process. SIFT keypoints/features of streams coming from different nodes are initially extracted. We then compute a euclidean distance between feature vectors and find the nearest neighbors to detect an overlapping region. From all the matches, subsets of features that agree on an object and its location/scale/orientation etc. between two streams from two different nodes are identified to be good matches with reasonable confidence and considered as a candidate for overlapped region.

In still further embodiments, location may be mapped based on image comparisons using deep neural networks ("DNN"). For example, a deep neural network may be operable for learning a similarity function. One shot learning may be applied with deep neural networks for learning a similarity function between streams from two different nodes. For example, we may learn a similarity function:

$d(steam_1, stream_2) = $ degree of difference between $stream_1$ and $stream_2$ If the two streams have a big overlapping region, the DNN needs to output a small number. On the other hand, a small or no overlap needs to yield a large number. The magnitude of d will define the amount of overlap. For this purpose, we may use a Siamese network to first encode each of the images from different nodes into an n-dimensional vector of features. We then compute a norm-distance as a measure for similarity. The Siamese network may take streams as input from different nodes, and based on these, output a vector of features representing each stream. The Siamese network may be configured in any number of ways, including various numbers of convolution layers and fully connected layers, without straying from the scope of the invention. The Siamese network then outputs a vector of features for each stream which can be compared.

With n-dimensional feature vector f(x) computed for each stream, we compute a norm-distance as:

$$d(x_1, x_2) = \|f(x_2)\|^2$$

The magnitude of $d(x_1, x_2)$ will provide a measure of the amount of overlap.

For example, the Siamese network contemplated herein is trained in a way to analyze images received from the nodes for the system. The Siamese network may receive two images from two different cameras. Each image will be processed by the Siamese network which will provide an output of features of that image. These feature outputs may then be compared to infer relative position of one relative to the other.

In further embodiments, we may extend this architecture to work for a general case where no overlapping exists. This model will take two images (one from two different nodes) as input, analyze reflection, rotation, translation etc. to compute the relative distance and angle between the two nodes. In other words, while there may be no overlapping parts of the image, the system may identify the same or similar elements, such as a basketball hoop, image on a court, or similar other landmark or guidepoint. Based on the differences in perceived size, angle, reflection, rotation, translation, and the like, of this similar element, relative location can be determined.

In one embodiment, the system may similarly extract n-dimensional feature vectors using the Siamese network, but these vectors are supposed to encode relative angle information. The distance d between nodes is computed as above. In addition to that, we compute the angle between them as:

$$\theta = \cos^{-1} \frac{f(x_1) \cdot f(x_2)}{\|f(x_1)\| \cdot \|f(x_2)\|}$$

In one embodiment, the system may be operable run all of the above mentioned processes parallely and then build a final ensemble learning model (decision trees, random forest, bagging, boosting etc.) to further improve the output.

In other embodiments, any two or more of the above methods of calculating relative position may be employed to increase accuracy and confidence. The methods may be calculated simultaneously or in series. Also, it should be understood that other non-disclosed methods of determining relative position may be used without straying from the scope of this invention.

Executing these methods for real time processing of streams can be computationally extensive. In one embodiment, the system may perform these operations lazily, for only a few nearby and most relevant nodes where the user may hop next get processed at each time step. All other nodes simply stay in the pool. If the user hops to a different node or changes location, the priority for nodes to be processed gets updated accordingly based on location data from the user node provided to the system.

In one embodiment, a user interface will encourage a user to view video streams from adjacent nodes, such that the user moves from node or cluster to adjacent node or cluster in one direction or other, in a dynamic "spinning" motion about the event at issue. In some embodiments, alternative motion such as moving directly between distant or opposite nodes will be prevented, though not in all cases. This will allow for more efficient and lazy relative mapping, compared to jumping from two very different streams. In other embodiments, jumping from node to node at random will be supported by the system. In still other embodiments, jumping from node to node at random will be possible, but discouraged through inconvenient user interface features.

All of the above methods proposed are discussed to be focused on individual nodes. But their extension to a cluster of nodes can be straightforward. The GPS coordinates or stream corresponding to a cluster can be assigned as the signal from a particular node (one-hot node best describing the cluster) or the average signals from all the member nodes and so on. After having parameters assigned to a cluster, all the methods described above will readily extend for the cluster. Organizing a group of nodes as a cluster will provide two benefits:

i) The user will be able to browse nodes hierarchically, first hopping from cluster to cluster and then choosing a node for watching its stream.

ii) Clusters will make lazy loading of nodes easier. For example, when the user is browsing inside one cluster, it is safe to skip processing nodes in other clusters.

One embodiment of forming a cluster involves a manual approach: consider the radius of a cluster as a hyperparameter and manually tune it for optimizing the performance and user experience. Another embodiment of forming a cluster involves a dynamic approach: dynamically set the size of the radius of the cluster based on the density of nodes in a specific geographic area. The more nodes- and thus the more video streams, in a particular area, the smaller an area covered by a cluster can be. With fewer nodes in an area, a cluster can be larger.

The system has been described thus far as relative to one user computerized device. As will be understood by those skilled in the art, in practice, many mobile computerized devices may be engaged with the server (or servers depending on scale) as nodes, with each mobile computerized device having the same functionality as discussed with respect to the single device. Indeed a plurality of mobile computing devices may be recording video, streaming video from the system, and/or accessing one of the plurality of different video streams at an event, thereby operating as nodes of the system. Accordingly, systems comprising multiple mobile computing devices as well as multiple servers, operating in the same way as discussed herein with respect to a single user device, are well within the scope of this disclosure, and any of the different embodiments disclosed.

Turning now to FIG. 1 a view of an embodiment of the video display system is provided. In this view, a user interface 10 of a mobile computing device is showing a plurality of video streams (nodes) 12 superimposed over a map of a stadium 11. These video streams 12 are relatively mapped to a location of a user mobile computing device device that is also in the stadium 11. Here, all of the video streams 12 are directed to the court 13, and given the number and location of the streams 12, a dynamic viewing of the event is possible. In addition to the relative mapping of the streams 12 to the user device, the system may analyze the video streams to more precisely pinpoint the location of the streams to a higher degree of precision than is possible by simply relying on GPS location data. This is useful both for relative mapping of streams to the user device, as well as for determining the precise location of the stream recording to be used for, for example, superimposing the location of the streams on a map, along with other data collection. As can be envisioned, nearby streaming videos will have overlapping fields of view, while those farther away will have less or no overlapping image areas. In further embodiments, the nodes 12 may be grouped into clusters (not shown) for efficiency and organizational purposes, as discussed above.

Figure 2:
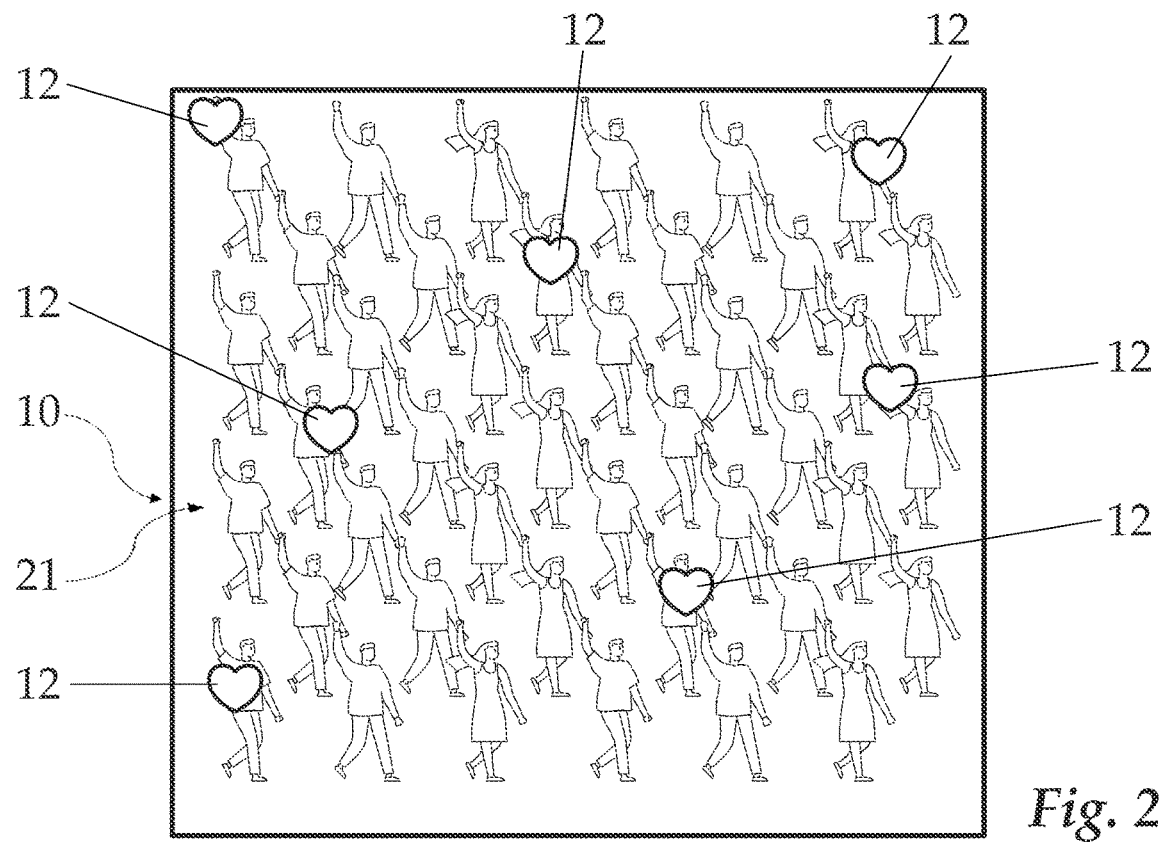
FIG. 2 provides a perspective view of a protest march having a number of active cameras recording the march.

FIG. 2 shows another embodiment of another embodiment of the video display system employed at an outdoor event such as a march, rally, or the like. In such an embodiment, where many of the recording camera nodes are moving and not fixed in one space (as they may be at a stadium with assigned seating), real time tracking and updating of relative position of the various video stream locations compared to the mobile computing device. Clustering also becomes important for efficient grouping of nodes and efficient processing of relative location within the clusters. Also, in moving and other more unpredictable node movement cases such as this view, a user interface which allows the user to select for video streams based on their relative position (See FIG. 4) may be preferable rather than selecting a particular view based on a display of stream locations superimposed on a map (See FIG. 1). However, in some embodiments, location of each video stream may be presented on a user interface superimposed over, for example, a map, a series of concentric circles showing distance from the user computerized device, and the like.

Figure 3:
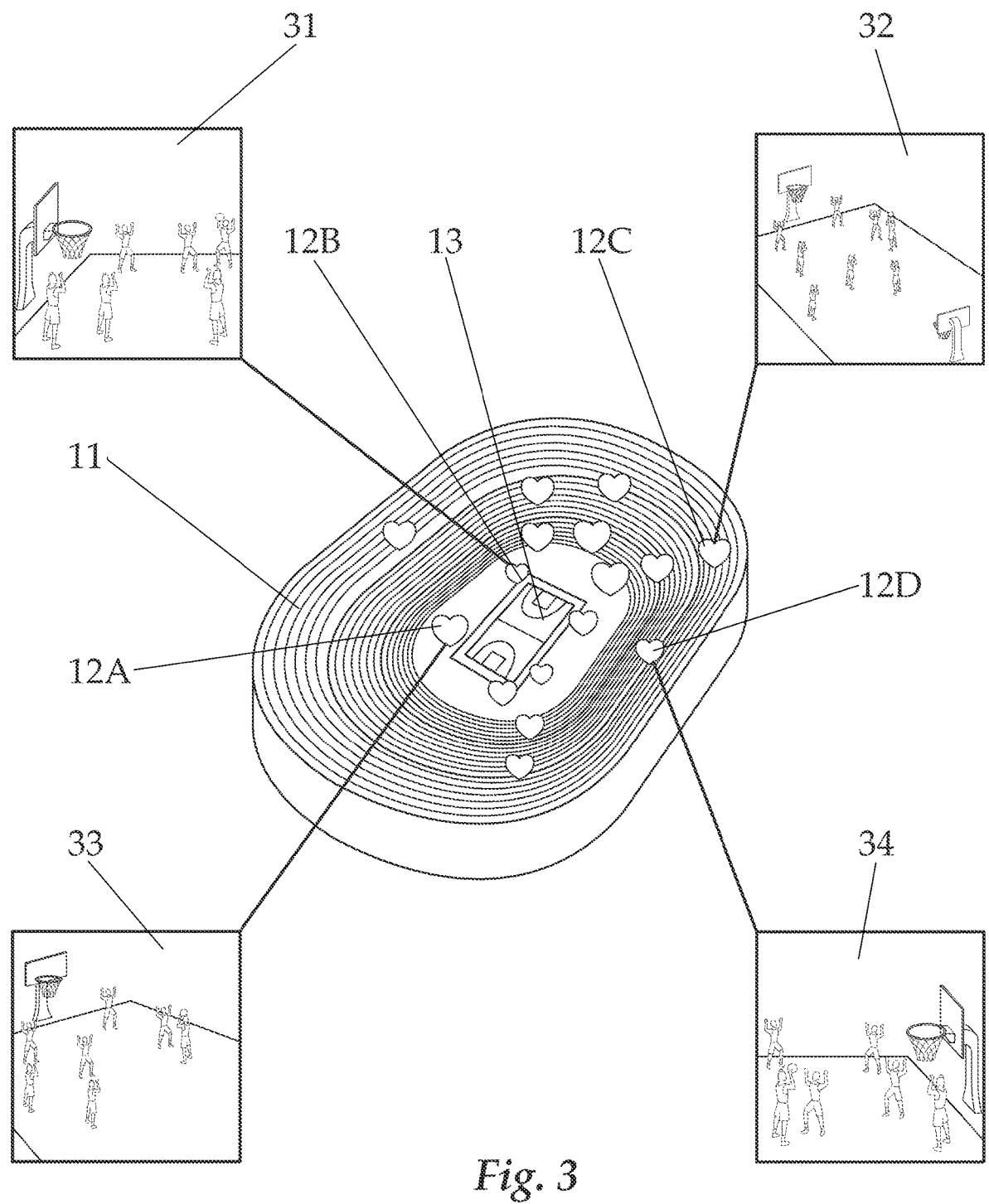
FIG. 3 provides a view of four different camera recordings of the same event in a stadium.

FIG. 3 provides a view of another embodiment of the video display system. Here, video streams from four different nodes are shown highlighting the multi-view features of the invention. A number of nodes 12 surround the court 13 in the stadium 11. Node 12A is streaming video 33, showing the action on the court from one angle. Node 12B is streaming video 31 which is close to the action on the court but has a more perpendicular angle compared to node 12A. Node 12C is streaming video 32 from a higher vantage point compared to nodes 12A and 12B, providing for an aerial view of the action. Node 12D is streaming video 34 which is at a high vantage point near half court. As can be envisioned, additional nodes provide additional video. Groups of close nodes, such as those in FIG. 3 behind the court on one side, and those along the corner of the court may be grouped together to form a cluster. This grouping may be performed automatically by the system as discussed throughout this disclosure using various and/or multiple methods. Once a cluster is selected, particular videos may be explored and selected.

Figure 4:
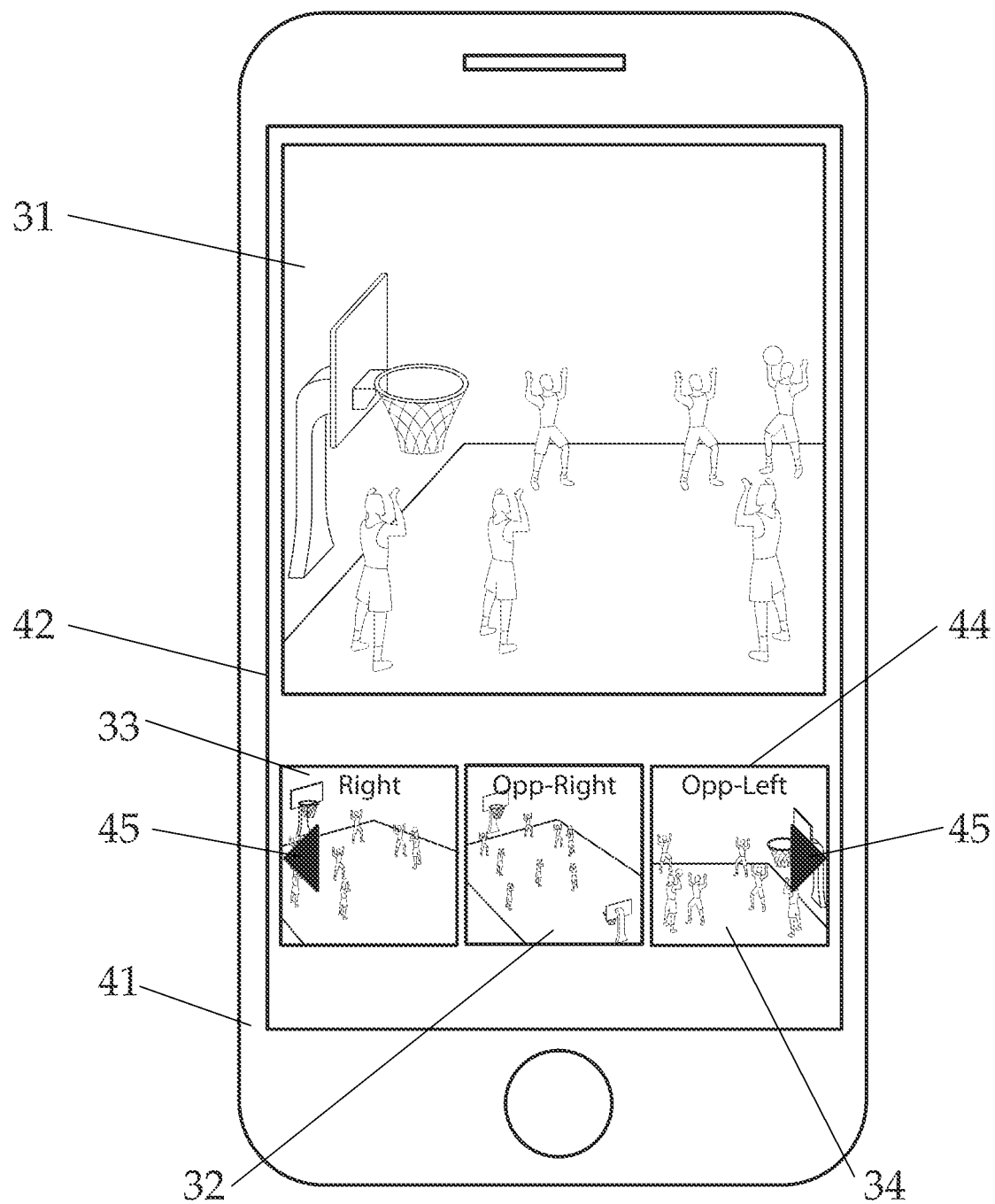
FIG. 4 provides a view of a user interface of the system contemplated herein allowing a user to view a video stream from a camera recording the event, as well as navigate to other video streams of cameras recording the same event from different angles.

FIG. 4 provides a view of a user interface presented on a user's mobile computing device accessing the event and streams of the event shown in FIG. 3. The stream 31 is being primarily displayed on the screen 42 of the mobile computing device 41, shown here as a smart phone. Also on the screen 42 are three other video streams which may be displayed as still images, icons representing the location, or small videos, among others. The streams represent the three nodes 12A, 12C, and 12D of FIG. 3. To navigate to other streams or clusters, a user may swipe, use arrows 45, or other input to navigate about the multi-view or dynamic video options. The system is also further operable, in this embodiment, to display the relative position of the viewing options, showing that stream 33 is to the right of stream 31, stream 32 is opposite to 31 and to the right, and stream 34 is opposite to 31 and to the left.

Figure 5:
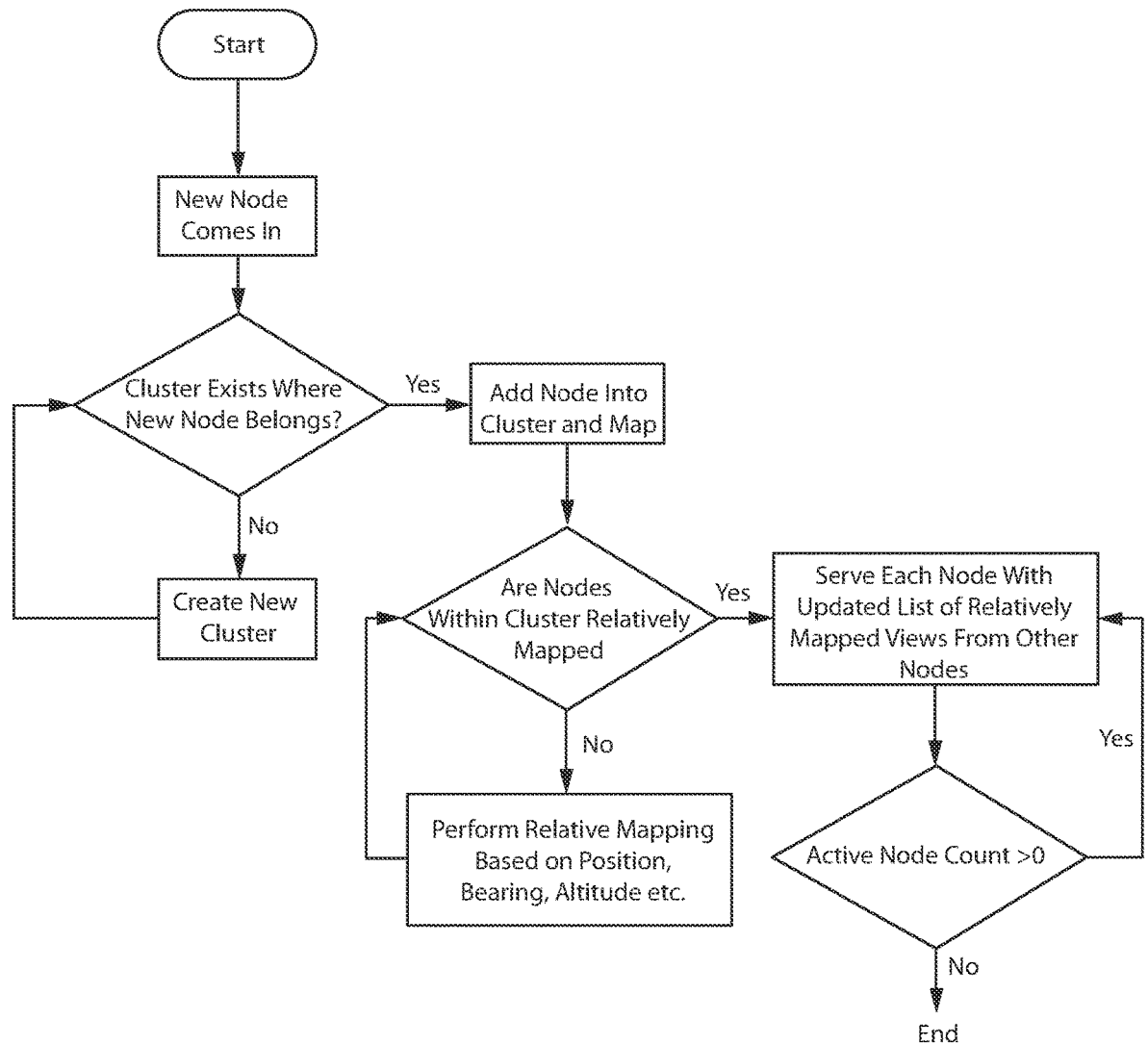
FIG. 5 provides a flow chart of operation of an embodiment of the present system.

FIG. 5 provides a flow chart of how the computerized system assigns nodes to clusters. As a new node (camera recording a video) comes online, the system will determine the location of the node and if a cluster exists where this new node belongs. In this embodiment, each node is assigned to a cluster, even if there is only one node in the cluster. Accordingly, if there is not a cluster where the new node belongs, a new cluster is created. The node is added into the cluster and into the map of the location of the node. If the nodes within the cluster have not already been relatively mapped, the relative mapping operations, such as those above, or any others, may be performed based on position, bearing, altitude, and the like. Once mapped, each node is served with an updated list of relatively mapped views from the other nodes. This may be updated in real time to ensure up to date and dynamic viewing of video streams of the event. In another embodiment, nodes may not belong to any cluster and may exist globally throughout the system.

Figure 6:
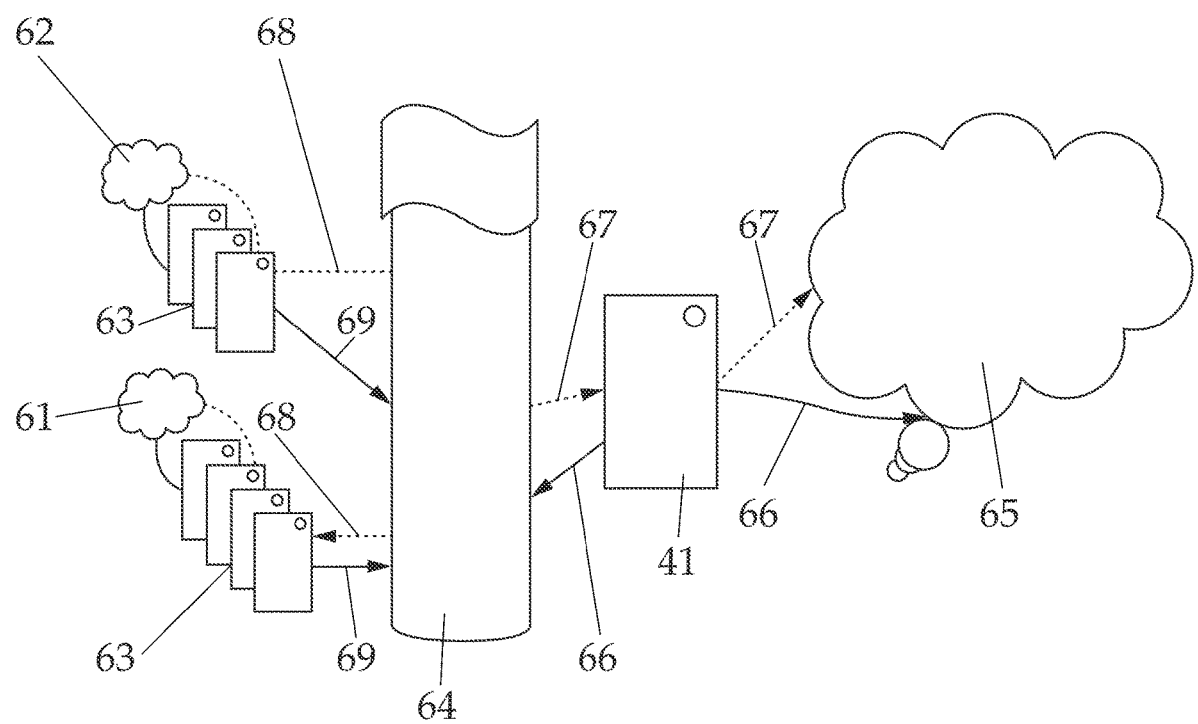
FIG. 6 provides a networked view of an embodiment of the system contemplated herein.

FIG. 6 provides a schematic view of a data flow of different devices interacting with the video streaming system. A central server 64 is in communication with the user's mobile computing device 41, as well as a plurality of other nodes 63, typically but not always other mobile computing devices such as smartphones. Some of the nodes 63 are grouped by the system into cluster 61, while others are grouped into cluster 62. A video stream 69 may be sent from each node 63 if the node is recording video. Further, other streams as well as location and/or clustering data is sent to the nodes via path 68 from the server 64. The user mobile computing device 41 is operable to both send recorded video to the server 64 via path 66, as well as receive video stream and location/cluster data from the server via path 67. Moreover, the mobile computing device 41 is in networked connection, via the internet, to external social networking or video sharing services 65, such as YouTube®, Facebook®, Twitter®, and the like. The mobile computing device 41 is operable to both transmit the video 66 it records as well as transmit the received video streams 67 from the server. As such, a user may transmit dynamic or multi-view video of an event live to an external service, for remote viewing by others not at the event.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth. All different aspects and embodiments disclosed herein may be applicable to other embodiments, such that, unless otherwise noted, all features disclosed herein are interchangeable with other features and versions of the invention.

What is claimed is:

1. A multi-view video streaming system comprising:
   a mobile computing device comprising a camera, a memory, a GPS receiver, a microprocessor, and a server;
   wherein the mobile computing device in wireless communication with the server, the server operable to transmit at least one video stream to the mobile computing device based on a location of the mobile computing device as determined by the GPS receiver;
   wherein the server is operable to transmit a plurality of video streams to the mobile computing device, each of the plurality of video streams being recorded from a node comprising a video camera;
   wherein the plurality of video streams comprises a first plurality of video streams and a second plurality of video streams, at least one of the server and the mobile computing device being operable to group a first plurality of nodes providing the first plurality of video streams into a first cluster based on a proximity of the first plurality of nodes, and wherein at least one of the server and the mobile computing device being operable to group a second plurality of nodes providing the second plurality of video streams into a second cluster based on a proximity of the second plurality of nodes;
   wherein each node in the first plurality and second plurality of nodes has a location, each node comprising information about the location; and
   wherein at least one of the mobile computing device and the server are operable to calculate a relative position of each node in the first plurality and second plurality of nodes based on the information about the location in order to relatively map the location of each node.

2. The system of claim 1 wherein the mobile computing device is operable to display, on a display screen of a user interface, an indication of the relative position of the at least one video stream and, upon receipt of an input, the mobile computing device is operable to present the at least one video stream on the display of the mobile computing device.

3. The system of claim 1 wherein the mobile computing device is operable to present, on a display screen of a user interface, an indication of the relative position of the first cluster and second cluster and, upon receipt of an input identifying the first cluster, the mobile computing device is operable to present a view of at least one of the first plurality of video streams on the display of the mobile computing device, and upon receipt of an input identifying the second cluster, the mobile computing device is operable to present a view of at least one of the second plurality of video streams on the display of the mobile computing device.

4. The system of claim 1 wherein the plurality of video streams surround an event and allow for a dynamic video viewing of the event by the mobile computing device.

5. The system of claim 1 wherein the server is operable calculate a location of the at least one video stream relative to the mobile computing device, and operable to transmit the location of the at least one video stream to the mobile computing device.

6. The system of claim 1 wherein the mobile computing device is operable to calculate a location of the at least one video stream relative to the mobile computing device.

7. The system of claim 1 wherein the at least one of the mobile computing device and the server are operable to calculate a location of the at least one video stream relative to the mobile computing device in real time.

8. The system of claim 1 wherein each of the plurality of nodes comprises a GPS receiver, a GPS location of each of the plurality of nodes being provided to the server.

9. The system of claim 1 wherein the mobile computing device is operable to record a video stream and transmit the video stream to the server along with a GPS location information received by the GPS receiver of the mobile computing device.

10. The system of claim 1 wherein the mobile computing device is in electronic communication with a remote network, the mobile computing device operable to transmit the at least one video stream received from the server to the remote network.

11. The system of claim 10 wherein the mobile computing device is operable to record a video stream, and operable to transmit the recorded video stream to the server and to the remote network.

12. The system of claim 1 wherein the at least one of the mobile computing device and the server are operable to calculate a location of the at least one video stream relative to the mobile computing device by calculating a pairwise distance between the mobile computing device and a node camera recording the at least one video stream and by calculating a relative bearing between the mobile computing device and the node camera.

13. The system of claim 1 wherein the at least one of the mobile computing device and the server are operable to calculate the location of the at least one video stream relative to the mobile computing device by identifying an overlapped region between the at least one video stream and an image or video recorded by the mobile computing device camera.

14. The system of claim 13 wherein the identifying of the overlapped region is performed by at least one of a template matching operation, and a feature mapping operation.

15. The system of claim 1 wherein the at least one of the mobile computing device and the server are operable to calculate the location of the at least one video stream relative to the mobile computing device by identifying an overlapping region between the at least one video stream and an image or video recorded by the mobile computing device camera, and determining a degree of difference between them, and further by analyzing at least one of a reflection, rotation, and translation between similar or the same elements in each of the at least one video stream and image or video recorded by the mobile computing device camera.

16. The system of claim 12 wherein the at least one of the mobile computing device and the server are further operable to calculate the location of the at least one video stream relative to the mobile computing device by identifying an overlapped region between the at least one video stream and an image or video recorded by the mobile computing device camera.

17. The system of claim 16 wherein the at least one of the mobile computing device and the server are further operable to calculate the location of the at least one video stream relative to the mobile computing device by analyzing at least one of a reflection, rotation, and translation between similar or the same elements in each of the at least one video stream and image or video recorded by the mobile computing device camera.

18. A method of viewing a plurality of video streams relatively mapped to a mobile computing device comprising the steps of:
receiving a plurality of video streams via a networked connection to a server by the mobile computing device, the mobile computing device comprising a camera, a memory, a GPS receiver, and a microprocessor; wherein each of the plurality of video streams is recorded from a node comprising a video camera, and the plurality of video streams comprises a first plurality of video streams and a second plurality of video streams;
grouping, by at least one of the server and the mobile computing device, the first plurality of nodes in order to provide the first plurality of video streams into a first cluster based on a proximity of the first plurality of nodes;
grouping, by at least one of the server and the mobile computing device, the second plurality of nodes in order to provide the second plurality of video streams into a second cluster based on a proximity of the second plurality of nodes;
wherein each node in the first plurality and second plurality of nodes has a location, each node comprising information about the location;
calculating, by at least one of the mobile computing device and the server, a relative position of each node in the first plurality and second plurality of nodes based on the information about the location;
receiving, from the server, a quantity of data comprising the relative position of each of the plurality of video streams relative to a location of the mobile computing device;
presenting, on a display of the mobile computing device, an indication of the relative position each of the plurality of video streams;
receiving an input by the mobile computing device indicating an input to the display of one of the plurality of video streams; and
displaying the one of the plurality of video streams on the mobile computing device.

19. The system of claim 1 wherein the plurality of video streams are not aggregated into a single video stream.

20. The system of claim 1 wherein at least one of the server and the mobile computing device being operable to group the first plurality and second plurality of nodes into the first and second cluster simplifies processing, which increases an efficiency of the processing.

21. The system of claim 1 wherein each of the plurality of video streams comprises a different view taken from a different angle of an event.

22. The system of claim 21 wherein the mobile computing device is operable to receive an input selecting one of the plurality of video streams and further operable to display the different view taken from the different angle of the event.

* * * * *